Figure 1:
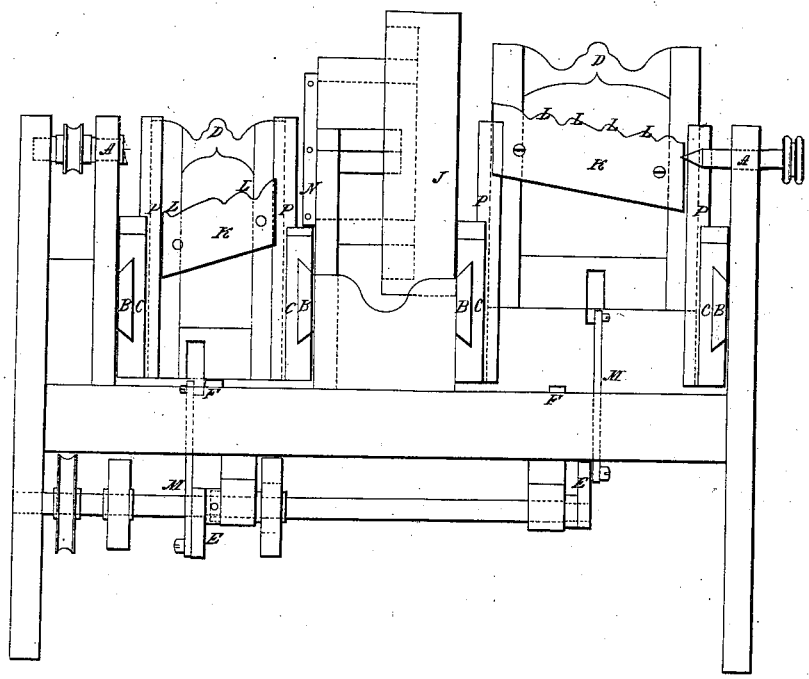
Figure 2:
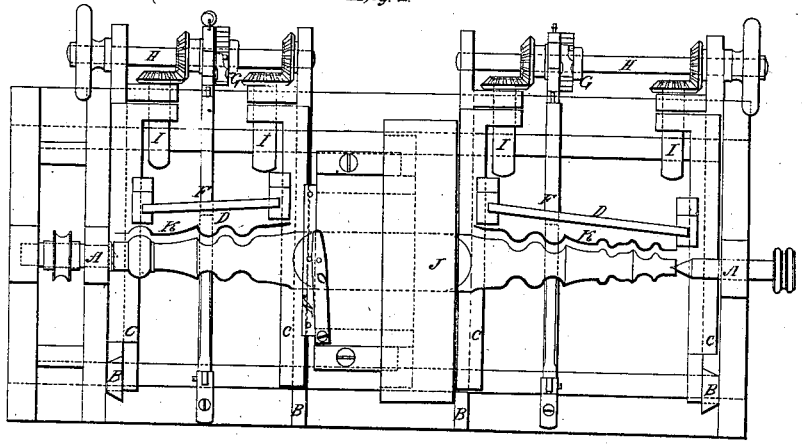

M. Roberts,
Gage Lathe.

N°29,103.    Patented July 10, 1860.

Witnesses:
Geo. E. Barnard,
Charles A. Bowker.

Inventor:
Milton Roberts.

UNITED STATES PATENT OFFICE.

MILTON ROBERTS, OF WORCESTER, MASSACHUSETTS.

LATHE.

Specification of Letters Patent No. 29,103, dated July 10, 1860.

*To all whom it may concern:*

Be it known that I, MILTON ROBERTS, of the city and county of Worcester and State of Massachusetts, have invented a new and useful Machine for Turning Wood; and I hereby declare the following is a full and exact description thereof, reference being had to the accompanying drawings and to the letters of reference marked thereon.

The nature of my invention consists, 1st, in arranging a line, or set of shaping, or molding tools, all in one piece, or matched in parts, on an oblique bar, in a reciprocating gate, moving transversely of the stick to be turned, so that, as the cutters move past the piece to be turned, a small part only of the tool or tools will be cutting at the same time; 2, shaping the cutters the reverse of the pattern to be produced, with a corresponding angle, to the oblique bar in the reciprocating gate, so that each, and every part of the tool or tools, shall follow in a direct line with the cutting edge; 3, beveling the forward part of the tool or tools, from their face, before grinding to a cutting edge, so that every variation shall have an angular forward projection, so that each and every part of the tool or tools, shall cut with the grain of the wood and with a drawing cut; 4th, using a series of vibrations of the reciprocating gate, when required, each vibration, bringing the cutters nearer to the piece to be turned, taking off a portion of the stock every vibration, until the piece is reduced to the form and size required; 5th, for bed-posts and the like, I use two reciprocating gates, (one on each side of the middle driving chuck) the cutters being arranged as set forth, only in reverse oblique lines, but in other respects the same; 6th, using a universal self-acting chuck, for driving, centering, steadying and holding the stick by the square, while the cutters are operating upon the wood; 7th, in combination with the above arrangement of machinery, I use an index-plate N, and indent O, for holding the piece stationary, while the cutters operate upon the wood, for the purpose of producing prismatic polygonal or multangular forms, the cutters being operated in like manner, as above, (only more rapidly).

To enable others skilled in the art, to make and use my invention, I will proceed to describe its construction and operation.

The heads A A, are made wider than the heads of a common lathe, for the purpose of attaching the horizontal guides B B, for the horizontal transverse slides C C.

The horizontal transverse slides $c$ $c$, have a perpendicular way or groove P, on each, in which slides the perpendicular transverse frame or gate D, on which are attached the cutters K. The reciprocating movement of the gate D is produced by the crank E and connecting rods M. The motion is given to the crank shaft by belts and gears so that the gate on which the cutters are attached shall move one inch while the stick to be turned makes from 15 to 20 revolutions.

The piece revolves the reverse direction of a common turning lathe while the cutters operate on the back side of the stick as being most convenient and out of the way of the person who tends the machine.

The horizontal transverse motion of the slides $c$ $c$ is produced by the screws I I which are turned by bevel gears on the ratchet shaft H. The lower end of the reciprocating gate presses on the lever bar F on its return stroke, and turns the ratchet G; thus feeding in the cutters every vibration, the required distance, the cutters taking off a portion of the wood every vibration until the work is finished.

The shaping or molding tools, are attached to an oblique bar on the reciprocating gate D, in one continued oblique line, on an oblique bar, so that a part only of each tool, shall be cutting at the same time, as they move by the piece to be turned.

The face of the cutters (or that part that is next to the wood,) is shaped the reverse of the pattern to be produced, and at the same time on an angle corresponding to the oblique bar on the reciprocating gate, so that each and every part of the tool or tools, shall follow in a direct line with the cutting edge.

The tools are first shaped the reverse of the pattern (as set forth). They should then be beveled from the face, on an angle of 130° to 145°, then sharpened bringing the edge on the face of the tools, which will make a forward angular projection on every variation of the shape, for the purpose of producing a drawing cut and cutting with the grain of the wood.

The cutters or tools are formed, with an undulating surface; consisting of ridges and valleys, running lengthwise of the tool or tools, so that, when the pattern or molding to be produced, is placed across the tools, at right angles with the ridges and valleys, the tools or cutters will be the exact counterpart of the pattern to be wrought.

The end of the tool or tools, or that part forming the cutting edge, is varied in length in proportion to the height of the ridges, or depth of the valleys, on the face of the tools; being made the shortest where the ridges are the highest and the longest where the valleys are the deepest, so that, (as the cutters move transversely of the stick to be turned,) that portion of the molding tool, which, forms the highest or largest part of the molding, shall begin to cut first, and that part of the tool which cuts the deeper portion of the molding shall follow after, as the cutters pass by the piece, thus insuring for every variation of the pattern, a gradual drawing cut, and, always with the grain of the wood. I also use the hollow chuck J in combination for bed posts and the like, for the purpose of driving, holding, steadying, and centering the piece to be turned by the square, while the cutters are operating upon the wood. This chuck is made with a hole through its center, sufficiently large to admit the stick to be turned. Inside are two V jaws, which are operated by a scroll on the inside of the loose part of the chuck, while the driving belt runs on its circumference, and when the stick is in motion, the belt operates the jaws of the chuck, with a power in proportion to the resistance of the cutters upon the work, making it a self acting universal chuck. I also use two reciprocating gates D D, with cutters attached, one on each side of the universal chuck, for bed posts, and the like, one for the part above the square, and one for the part below the square, with a similar arrangement of cutters, and operated by like machinery.

In combination with the above machinery for making round turning, I use an index N and indent O, on the universal chuck J, for the purpose of holding the stick stationary, while the cutters operate upon one side of the work, at the same time, vibrating in like manner, for the purpose of turning prismatic polygonal or multangular forms.

Operation: The stick is inserted through the hollow chuck J, the jaws are then brought together by drawing upon the driving belt, which centers the piece, it is then fastened at each end, in the ordinary manner. Motion is then imparted to the stick, the cutters pass up on the back side of the work, taking off a portion of the stock at every vibration, until the work is finished.

I do not claim the attachment of a series of knives to a frame moving transversely of the stick, to be turned, each set forming salient angles with each other, on the frame, the grooving tools following to finish the work, as granted to me in Letters Patent, Aug. 23, 1853; but—

I claim:

1. Arranging one or more shaping or molding tools in one piece or in parts, on an oblique bar in a reciprocating gate, which moves transversely of and at right angles with the piece to be turned, in the manner and for the purpose specified.

2. In combination with the middle chuck, I claim two reciprocating gates, in the manner and for the purpose set forth.

3. The application of the hollow universal chuck, or its equivalent, in the manner and for the purpose set forth.

MILTON ROBERTS.

Witnesses:
S. A. HOWLAND,
A. L. BURBANK.